United States Patent
Ishihara et al.

(10) Patent No.: US 10,950,901 B2
(45) Date of Patent: Mar. 16, 2021

(54) SYSTEM AND METHOD FOR CHARGE PROTECTION OF A LITHIUM-ION BATTERY

(71) Applicant: TOYOTA MOTOR EUROPE, Brussels (BE)

(72) Inventors: Yuya Ishihara, Brussels (BE); Yuki Katoh, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

(21) Appl. No.: 16/315,057

(22) PCT Filed: Mar. 31, 2017

(86) PCT No.: PCT/EP2017/057736
§ 371 (c)(1),
(2) Date: Jan. 3, 2019

(87) PCT Pub. No.: WO2018/177544
PCT Pub. Date: Oct. 4, 2018

(65) Prior Publication Data
US 2020/0220229 A1    Jul. 9, 2020

(51) Int. Cl.
| | | |
|---|---|---|
| *H01M 10/44* | (2006.01) | |
| *H02J 7/00* | (2006.01) | |
| *H01M 2/34* | (2006.01) | |
| *H01M 10/0525* | (2010.01) | |
| *H01M 10/48* | (2006.01) | |
| *H01M 4/02* | (2006.01) | |

(Continued)

(52) U.S. Cl.
CPC ........ *H01M 10/443* (2013.01); *H01M 2/348* (2013.01); *H01M 4/38* (2013.01); *H01M 10/0525* (2013.01); *H01M 10/46* (2013.01); *H01M 10/486* (2013.01); *H02J 7/0047* (2013.01); *H02J 7/007194* (2020.01); *H01M 2004/028* (2013.01)

(58) Field of Classification Search
CPC .. H01M 10/443; H01M 10/46; H01M 10/486; H01M 10/052; H01M 10/0562; H01M 10/44; H02J 7/007194; H02J 7/0047
USPC ....................................................... 320/150
See application file for complete search history.

(56) References Cited

U.S. PATENT DOCUMENTS

| | | | |
|---|---|---|---|
| 6,376,123 B1 | 4/2002 | Chu | |
| 9,197,096 B2* | 11/2015 | Bhardwaj | ........ H02J 7/007192 |

(Continued)

OTHER PUBLICATIONS

Written Opinion of the International Searching Authority of PCT/EP2017/057736 dated May 15, 2017.

(Continued)

*Primary Examiner* — M Baye Diao
(74) *Attorney, Agent, or Firm* — Sughrue Mion, PLLC

(57) ABSTRACT

A method for controlling a charge process of a solid-state battery having a sulfur-based positive electrode is provided. The method includes monitoring and storing a temperature of the solid-state battery and a predetermined interval, when the temperature exceeds a threshold temperature, monitoring the temperature of the solid-state battery and/or processing the stored temperature data of the solid-state battery, for an indication of sulfur sublimation, and terminating a flow of charge current upon detection of the indication of sulfur sublimation.

6 Claims, 2 Drawing Sheets

(51) Int. Cl.
  *H01M 4/38*   (2006.01)
  *H01M 10/46*  (2006.01)

(56) References Cited

U.S. PATENT DOCUMENTS

| | | | | |
|---|---|---|---|---|
| 9,799,933 | B2* | 10/2017 | Lohmann | H01M 4/64 |
| 9,893,385 | B1* | 2/2018 | Nayar | H01M 10/425 |
| 2003/0186111 | A1 | 10/2003 | Tamakoshi | |
| 2008/0193835 | A1* | 8/2008 | Mikhaylik | H01M 10/052 |
| | | | | 429/156 |
| 2009/0243548 | A1 | 10/2009 | Hoff | |
| 2012/0043942 | A1* | 2/2012 | Tamane | H01M 10/443 |
| | | | | 320/136 |
| 2012/0286793 | A1* | 11/2012 | Kawaoka | H01M 2/34 |
| | | | | 324/426 |
| 2013/0187614 | A1* | 7/2013 | Bhardwaj | H01M 10/443 |
| | | | | 320/134 |
| 2017/0214083 | A1* | 7/2017 | Darolles | H01M 10/0565 |
| 2020/0220229 | A1* | 7/2020 | Ishihara | H01M 2/348 |

OTHER PUBLICATIONS

International Search Report of PCT/EP2017/057736 dated May 15, 2017.

* cited by examiner

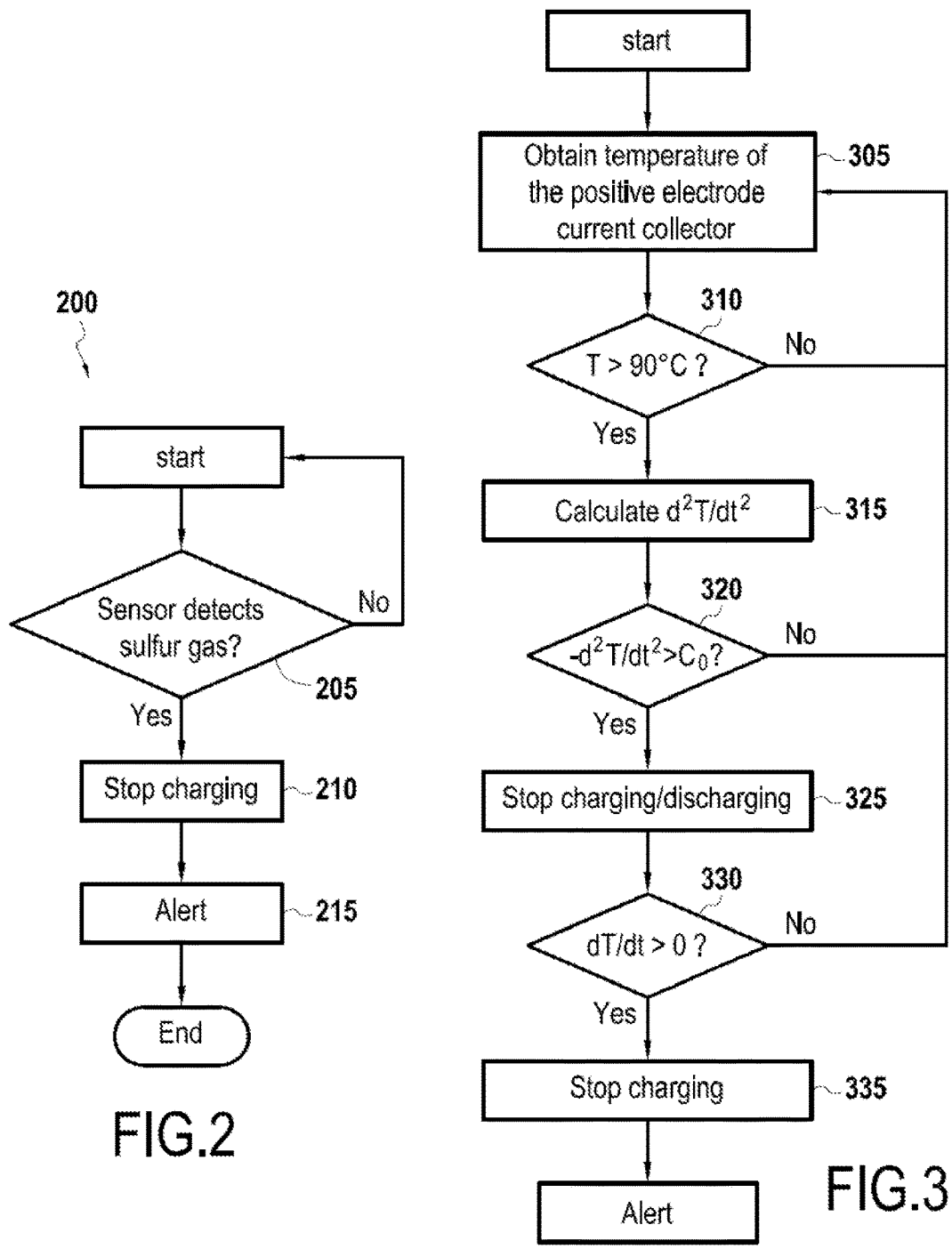

SYSTEM AND METHOD FOR CHARGE PROTECTION OF A LITHIUM-ION BATTERY

CROSS REFERENCE TO RELATED APPLICATIONS

This application is a National Stage of International Application No. PCT/EP2017/057736 filed Mar. 31, 2017.

FIELD OF THE DISCLOSURE

The present disclosure is related to solid-state, lithium-based batteries or cells, and more particularly to protective measures for such batteries having a sulfur-based positive electrode.

BACKGROUND OF THE DISCLOSURE

Lithium-based batteries are part of a family of rechargeable battery types in which lithium ions move from the negative electrode to the positive electrode during discharge and from the positive electrode to the negative electrode when charging.

There are various types of lithium-based batteries, and interest has arisen in solid-state type batteries in recent years. In such batteries, an electrolyte of the battery, previously a liquid or gel, is replaced by a solid material. For example, JP 2011-028883 discloses a secondary battery with a lithium-ion-conductive nonaqueous electrolyte. Such solid state batteries tend to have improvements in performance as a temperature increases.

It has been demonstrated that batteries, e.g., a lithium-ion battery in which the positive electrode comprises sulfur (S), have a promising energy density that is higher than many other types of lithium-based batteries. Further, because of the abundance and relatively low cost of sulfur, these batteries can be produced with significant savings over other battery technologies.

For example, JP 2004-095243 discloses a lithium-based secondary battery, where sulfur functions as the positive electrode active material, the whole solid-state lithium battery being designed to operate essentially at room temperature.

However, during a charging process of a lithium-ion battery having a sulfur-based positive electrode, sulfur (S) is produced at the positive electrode. In addition, temperature increases during a charging process and sulfur begins to sublime at 102° C., and melts at 115° C. If, for example, as a result of puncture or overcharging, the battery begins to overheat, the sulfur may sublime and/or melt to a liquid. If fluidized sulfur reaches the negative electrode, an exothermic reaction can occur, thereby resulting in battery damage and/or additional undesirable consequences.

SUMMARY OF THE DISCLOSURE

The present inventors have recognized that it is desirable to control a charging process of a lithium-ion, solid-state battery having a sulfur-based positive electrode, to prevent sublimation and/or melting of the sulfur such that it cannot reach the negative electrode of the solid-state battery.

According to embodiments of the present disclosure, a method for controlling a charge process of a solid-state battery having a sulfur-based positive electrode is provided. The method includes monitoring and storing a temperature of the solid-state battery and a predetermined interval, when the temperature exceeds a threshold temperature, monitoring the temperature of the solid-state battery and/or processing the stored temperature data of the solid-state battery, for an indication of sulfur sublimation, and terminating a flow of charge current upon detection of the indication of sulfur sublimation.

The monitoring may be performed by a temperature sensor.

The monitoring for sulfur sublimation may include monitoring the temperature of the solid-state battery for a drop in temperature that occurs at a rate greater than a predetermined threshold rate.

According to further embodiments of the present disclosure, a battery charger for a solid state battery having a sulfur-based positive electrode is provided. The battery charger includes a current providing section configured to provide current to the solid-state battery, a monitoring section configured to monitor and record a temperature of the solid-state battery, and a controller. The controller is configured to, when the temperature of the solid-state battery exceeds a threshold temperature, monitor the temperature of the solid-state battery and/or process the stored temperature data of the solid-state battery, for an indication of sulfur sublimation, and to terminate a flow of current to the solid-state battery when an indication of sulfur sublimation is identified.

According to still further embodiments of the disclosure, a use of a battery charger as described above, for charging a solid-state battery comprising a sulfur-based positive electrode and a temperature sensor, is provided.

It is intended that combinations of the above-described elements and those within the specification may be made, except where otherwise contradictory.

The accompanying drawings, which are incorporated in and constitute a part of this specification, illustrate embodiments of the disclosure and together with the description, and serve to explain the principles thereof.

BRIEF DESCRIPTION OF THE DRAWINGS

FIG. 1 shows a schematic representation of an exemplary lithium-ion cell having a positive electrode comprising sulfur;

FIG. 2 shows a flowchart of an exemplary method for charging a solid-state battery having a sulfur-based positive electrode according to embodiments of the disclosure;

FIG. 3 shows a flowchart of an exemplary method for detecting an endothermic event within the solid state battery of FIG. 1;

DESCRIPTION OF THE EMBODIMENTS

Figure 4A:
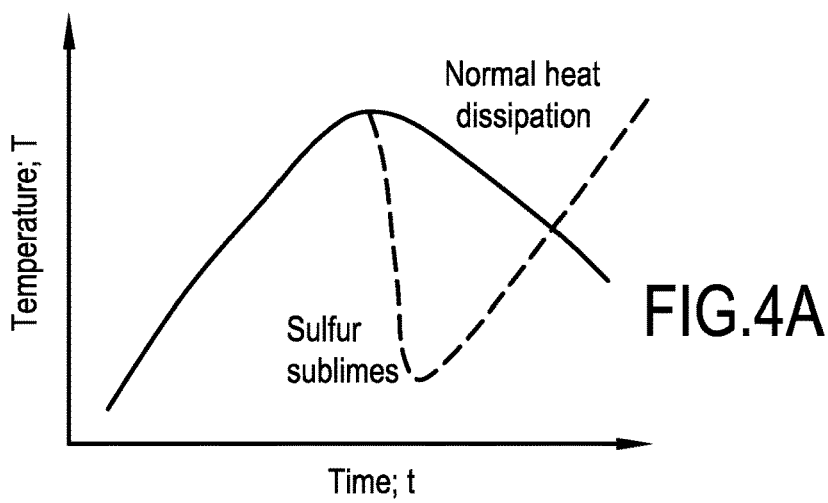
FIG. 4A shows a graphical representation of an endothermic event modeled as a second order differential equation.

Reference will now be made in detail to exemplary embodiments of the disclosure, examples of which are illustrated in the accompanying drawings. Wherever possible, the same reference numbers will be used throughout the drawings to refer to the same or like parts.

FIG. 1 shows a schematic representation of an exemplary all solid-state, lithium cell 10. The lithium cell 10 includes an negative electrode 12 fixed on an negative current collector 14 and a positive electrode 16 fixed on a positive current collector 18. The negative electrode 12 and the positive electrode 16 are separated by a solid electrolyte 22 with which the negative electrode 12 and positive electrode 16 are directly in contact. In addition, a temperature sensor 20 is provided, within the cell 10, for example, near positive electrode 16.

According to exemplary embodiments, positive electrode 16 comprises sulfur in an amount greater than about 70 percent by weight.

Negative electrode 12 may comprise, for example, Carbon, Si, Li metal, $Li_4Ti_5O_{12}$, $TiO_2$, Sn, Al etc., as desired based on a particular battery design.

Each of the positive and negative current collectors 14 and 18 may comprise, for example, Cu, Al, Ni, stainless steel, etc., and the material may be the same for each, or may differ based on a desired battery design.

Solid electrolyte 22 of cell 10 may comprise a binder, e.g., a polymer, in addition to an electrolyte compound comprising sulfur. For example, solid electrolyte 22 may comprise a polyethylene oxide (PEO) binder with $LiCF_3SO_3$ as the electrolyte. Additional examples include, a polyphenyleneoxide (PPO) binder with a $LiCF_3SO_3$ electrolyte, a Poly[EO+2(2-methoxyethoxy)ethylglycidylether(MEEGE)] binder with an $LiCF_3SO3$ electrolyte, polysiloxane binder with $LiClO4$ electrolyte, Li2S—SiS2 electrolyte, Li0.35La0.55TiO3 (LLTO) electrolyte, and/or Li2S—GeS2-P2S5 electrolyte, etc. One of skill will recognize that these compounds may be used in combination or individually, as desired, and any of the electrolytes used with any of the polymer binders.

Temperature sensor 20 is configured to provide a signal indicative of a temperature within a case of cell 10, for example, a temperature of the positive electrode 16. Temperature sensor 20 may comprise a thermistor, for example, of which the signals is monitored continuously or at predetermined intervals, such that a temperature history inside the case may be monitored and recorded (e.g., stored in a database).

Temperature sensor 20 may be positioned within a case (not shown) of the battery. For example, temperature sensor 20 may be provided near positive electrode 16 and/or affixed to a portion of the positive electrode 16.

Depending on an intended, or installed, orientation of the battery, temperature sensor 20 may be positioned so as to be near a top of the battery case. Alternatively, or in addition, multiple temperature sensors 20 may be positioned around the interior of the case, so that temperature samples may be obtained from various locations within the case. For example, a second temperature sensor 20 may be positioned at a bottom of the battery case, as determined when the battery case is in a final installed position. One of skill will recognize that various locations within the battery case may be suitable for placement of temperature sensor 20, and that any such location is intended to fall within the scope of the present disclosure.

Figure 5:
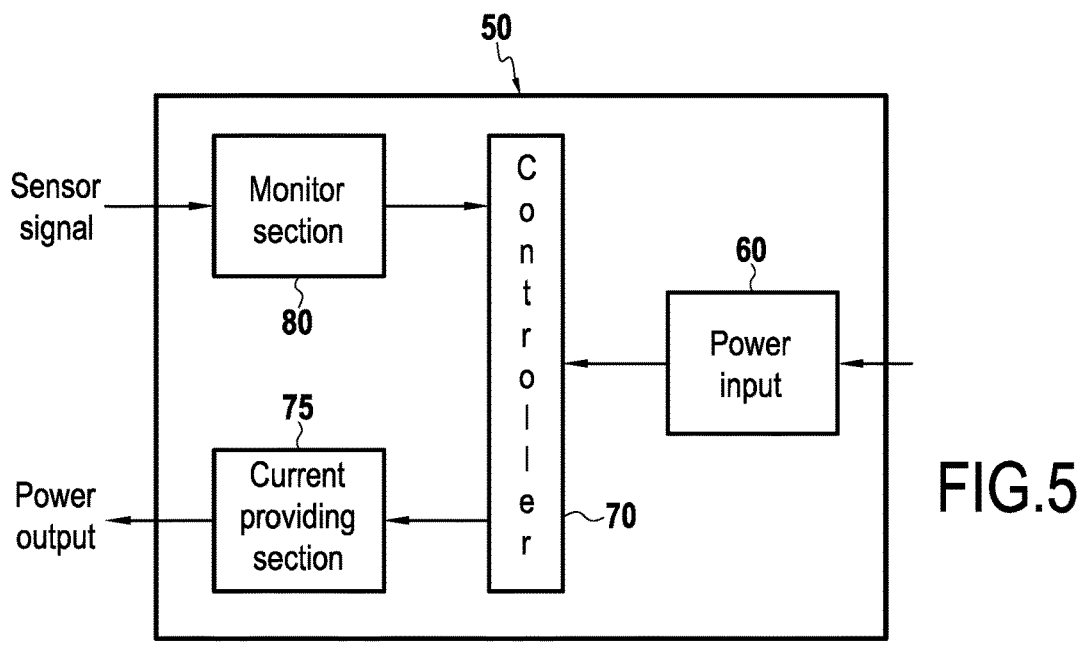
FIG. 5 is a high-level representation of an exemplary charger configuration for charging a lithium-ion cell having a positive electrode comprising sulfur.

FIG. 5 is a high-level representation of an exemplary charger configuration for charging a lithium-ion cell having a positive electrode 16 comprising sulfur. Charger 50 may comprise, among others, a monitoring portion 80, a current providing portion 75, a power input 60, and a controller 70.

Power input 60 may be configured to receive power as either AC or DC current, for example, from the mains or other suitable power source, such as a battery. Power input 60 may be configured to convert AC current received to DC current, for example, or to provide AC current to another section of charger 50, for example, current providing section 75, for such a conversion.

Current providing section 75 may be configured to provide a current to a device external to charger 50, for example, cell 10. Current providing section 75 may be configured to set a provided current at a value as determined by controller 70, as will be discussed below, and may further be enabled to stop a flow of current from charger 50, as desired. One of skill in the art will recognize that lithium-ion batteries are typically charged with a current limiting control to avoid undesirable consequences with the battery. Current providing section 75 may be configured to provide such functionality in conjunction with controller 70.

Monitoring section 80 may be configured to monitor signals from one or more temperature sensors 20, and/or store records to a temperature history database related to the temperature history.

Controller 70 may be configured to control the operation of charger 50, for example, setting an output current and voltage from charger 50, and to terminate charging current when, for example, a full charge level is reached or sulfur gas is detected in the battery case.

FIG. 2 shows a flowchart 200 of an exemplary method for charging a solid-state battery having a sulfur-based positive electrode, while FIG. 3 shows a flowchart 300 of an exemplary method for detecting sulfur gas resulting from an endothermic event within the solid state battery of FIG. 1.

During charging of cell 10, temperature sensor 20 may be continually monitored by, for example, controller 70, to determine whether sulfur gas is being produced (e.g., via sublimation) as a result of the charging process (step 205). When production of sulfur gas is detected (step 205: Yes), controller 70 terminates a flow of current to cell 10 to stop the charging process (step 210). An alert may then be made to notify an operator, for example, to indicate that charging has been stopped (step 215).

In FIG. 3, the process of monitoring for sulfur gas production (e.g., via sublimation) is detailed (i.e., step 205 of FIG. 2). Temperature at and/or near positive electrode 16 is monitored, and the values of temperature are stored in, for example, a history database (step 305).

If it is determined that the monitored temperature has not exceeded a threshold value, e.g., 90 degrees C., (step 310: no) the routine returns to the monitoring step to continue the temperature surveillance. If it is determined that the monitored temperature has exceeded the threshold value (e.g., greater than 90 degrees C.), then the temperature history is consulted to determine a value of a second order differential of relationship between temperature over time $d^2T/dt^2$ (step 315).

As shown at FIG. 4A, during charging of a cell 10, the temperature increases. Sublimation of sulfur is an endothermic event, and when such sublimation occurs, the temperature falls as heat is absorbed for the sublimation. Taking the negative of the calculated value, and comparing it to a constant $C_0$ delineating a normal range for $-d^2T/dt^2$ and a sublimation range (step 320) it becomes possible to infer the occurrence of an endothermic event, i.e., sublimation of sulfur.

Figure 4B:
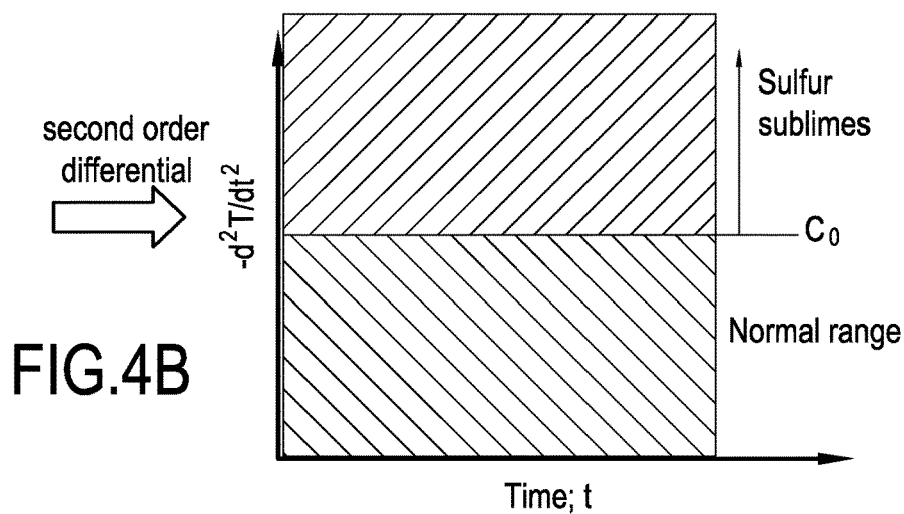
FIG. 4B shows a graphical representation of a normal range for a battery constant and a sublimation range of the battery.

At FIG. 4B, a graph showing a normal range for a value of the second order differential (i.e., $<C_0$), and a sublimation range of the second order differential (i.e., $>=C_0$) The constant $C_0$ is determined experimentally for each battery, for example, by using a sulfur fluid sensor and correlating sublimation of sulfur with a temperature history.

If a sublimation event cannot be inferred (step 320: no), the routine returns to monitoring of the temperature (step 305).

If a sublimation event can be inferred (step 320: yes), current flow to or from the cell 10 is stopped (step 325) and a determination made whether the sublimated sulfur has begun reacting with materials of negative electrode 12 (step 330).

If sulfur begins reacting with materials of the negative electrode 12, the temperature begins to increase rapidly, and the first order differential dT/dt becomes greater than 0. Therefore, an evaluation of this first order differential may be undertaken and if the value is not greater than 0 (step 330: no) charging may be resumed and the routine returns to monitoring (step 305).

However, if the value is greater than 0 (step 330: yes), then it is assumed that sublimated sulfur has begun reacting with materials of the negative electrode 12, and flow of current is stopped definitively to and from cell 10 (step 335) and an alert raised, e.g., an audio and/or visual alert.

The method and system are described in terms of a single cell 10. However, it may be easily adapted for batteries having multiple cells 10.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for controlling a charge process of a solid-state battery having a sulfur-based positive electrode, the method comprising:
    continuously monitoring and storing a temperature of the solid-state battery at a predetermined interval to obtain temperature history data;
    when, during the continuous monitoring, a monitored temperature exceeds a predetermined threshold temperature, processing the temperature history data for an indication of sulfur sublimation; and
    terminating a flow of charge current of the solid-state battery upon detection of the indication of sulfur sublimation,
    wherein the predetermined threshold temperature is 90 degrees C.,
    wherein the monitoring, storing, and processing are performed by a controller of a battery charger,
    wherein the processing comprises:
        determining a value of a second order differential of a relationship between temperature over time $d^2T/dt^2$ from the temperature history data,
        comparing a negative of the value of the second order differential to a constant $C_0$ that delineates a normal range for $-d^2T/dt^2$, and
        when the value of the second order differential is greater than or equal to $C_0$, determining whether a value of a first order differential dT/dt is greater than 0 as the indication of sulfur sublimation.

2. The method according to claim 1, wherein the monitoring is performed by a temperature sensor.

3. The method according to claim 1, wherein the constant $C_0$ is determined prior to the monitoring.

4. The method according to claim 1, wherein the constant $C_0$ is determined experimentally for each battery.

5. A battery charger for a solid state battery having a sulfur-based positive electrode, the battery charger comprising:
    a current providing section configured to provide current to the solid-state battery;
    a monitoring section configured to continuously monitor and record a temperature of the solid-state battery at a predetermined interval to obtain temperature history data; and
    a controller configured to:
    when, during the continuous monitoring, a monitored temperature of the solid-state battery exceeds a predetermined threshold temperature, processing the temperature history data for an indication of sulfur sublimation; and
    to terminate a flow of current to the solid-state battery when an indication of sulfur sublimation is identified,
    wherein the predetermined threshold temperature is 90 degrees C.,
    wherein, to process the temperature history for the indication of sulfur sublimation, the controller is further configured to:
        determine a value of a second order differential of a relationship between temperature over time $d^2T/dt^2$ from the temperature history data,
        compare a negative of the value of the second order differential to a constant $C_0$ delineating a normal range for $-d^2T/dt^2$, and
        when the value of the second order differential is greater than or equal to $C_0$, further determine whether a value of a first order differential dT/dt is greater than 0 as the indication of the sulfur sublimation.

6. A method, comprising:
connecting a solid-state battery to a battery charger according to claim 5, and
charging the solid-state battery,
the solid-state battery comprising a sulfur-based positive electrode and a temperature sensor.

* * * * *